United States Patent [19]

Nowak

[11] 4,418,925
[45] Dec. 6, 1983

[54] COLLET CLOSING MECHANISM

[76] Inventor: Florian I. Nowak, 16 Dean Dr., Newington, Conn. 06111

[21] Appl. No.: 363,104

[22] Filed: Mar. 29, 1982

Related U.S. Application Data

[63] Continuation-in-part of Ser. No. 312,387, Oct. 19, 1981.

[51] Int. Cl.³ .............................................. B23B 31/20
[52] U.S. Cl. ........................................ 279/50; 279/51
[58] Field of Search ...................... 279/37, 43, 50, 51, 279/56, 57, 58, 74, 121, 122

[56]   References Cited
U.S. PATENT DOCUMENTS 2,400,183  5/1946  Wilson .................................. 279/50
2,816,768  12/1957  Stoner et al. .......................... 279/50
2,961,247  11/1960  Ziaylek, Jr. ............................ 279/51
3,273,907  9/1966  Voderberg et al. ................... 279/50
4,014,558  3/1977  Brinkman ............................. 279/50

FOREIGN PATENT DOCUMENTS 571421  8/1945  United Kingdom ................. 279/51

Primary Examiner—William R. Briggs
Assistant Examiner—Daniel W. Howell

[57]        ABSTRACT

A collet closing mechanism utilizes an array of wedge members as the force transmitting elements, to maximize the area for contact with associated bearing surfaces. The device is highly durable, safe and effective for its intended purposes.

15 Claims, 15 Drawing Figures

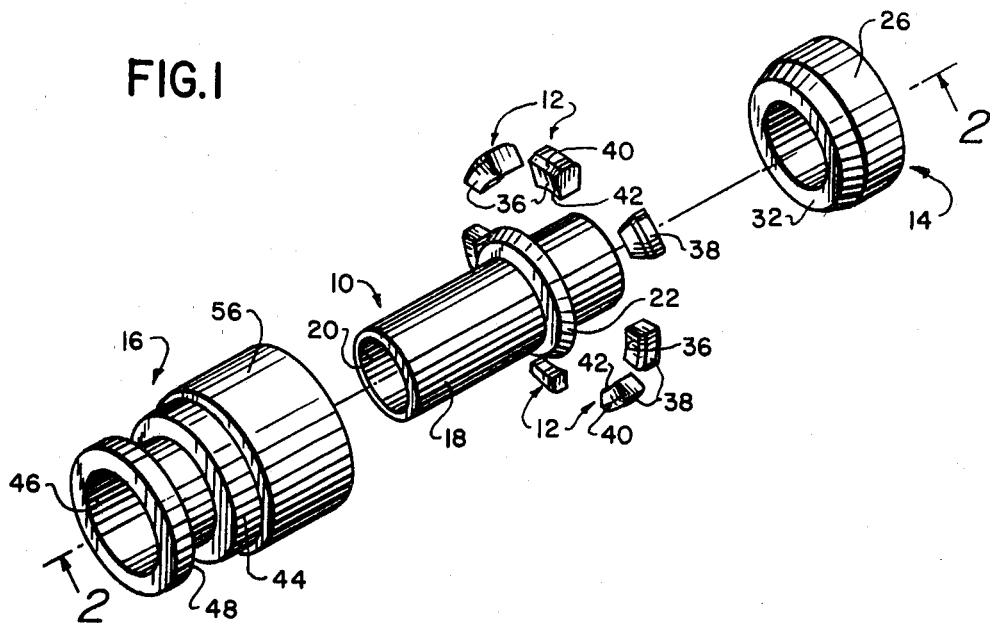
FIG.1
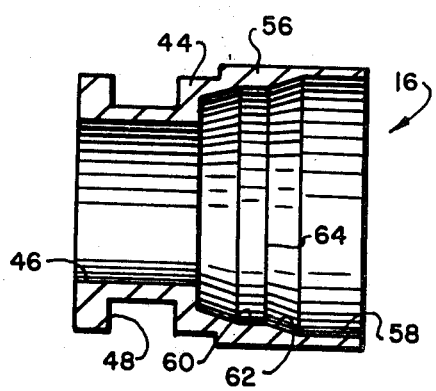
FIG.2
FIG.3
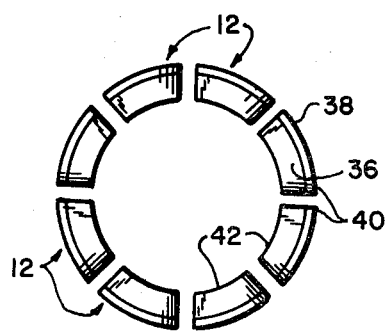
FIG.5
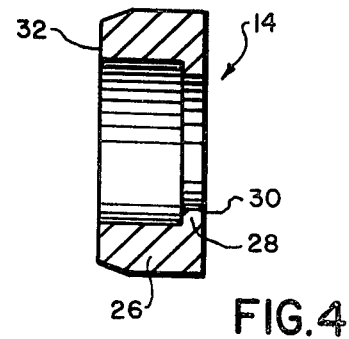
FIG.4

COLLET CLOSING MECHANISM

CROSS REFERENCE TO RELATED APPLICATION

This application is a continuation-in-part of application for Letters Patent Ser. No. 312,387 filed on Oct. 19, 1981 and entitled COLLET CLOSING MECHANISM.

BACKGROUND OF THE INVENTION

The collet used to secure the work in an automatic bar machine, screw machine, or the like, is normally closed by shifting an outer spindle over an enlarged forward end portion of the collet. The means for shifting the outer spindle is generally referred to as the "collet closing mechanism", and for many years the most widely used mechanisms of this sort comprised an arrangement of chuck levers mounted in a chuck lever fulcrum. Due, however, to the necessary construction of the parts and their constant subjection to forces of relatively large magnitude, breakage has been common, with attendant risk to personnel and damage to machinery.

Other designs for collet closing mechanisms have been proposed in an effort to avoid such problems, notable amongst which is the so-called "ball-chucker" system. This device utilizes a circular array of ball bearings, which are held within a cage in place behind a slidably mounted thrust collar, and which can be forced by an outer, slidably mounted sleeve into a circumferential channel defined behind the collar. Movement of the sleeve over the ball bearings forces them into the tapered groove, causing the thrust collar to shift forwardly; this motion is transmitted by appropriate means to the outer spindle which, in turn, closes the collet in the usual manner. While such devices offer decided advantages over the earlier lever-operated mechanisms, still they suffer from serious deficiencies. In particular, due to the minimal contact area provided by the spherical bearings, wear on the mating parts is extreme, thus limiting the useful life and practical value of the device.

Accordingly, it is an object of the present invention to provide a novel collet-operating mechanism which avoids the disadvantages of the devices heretofor utilized for the purpose.

It is a more specific object of the invention to provide such a mechanism in which levers are not employed, thus avoiding the risks attendant to the relatively weak construction that such a design entails.

Another more specific object of the invention is to provide such a mechanism in which the rate of wear is reduced substantially from that which is inherent in the use of spherical members for the transmission of closing force, and which therefore affords a much longer useful life.

Yet another object of the invention is to provide such a mechanism which is relatively simple in design and inexpensive to produce, and which nevertheless operates smoothly to provide a positive and dependable closing action.

SUMMARY OF THE DISCLOSURE

It has now been found that the foregoing and related objects of the present invention are readily attained in a collet operating mechanism comprising a supporting sleeve member adapted for mounting upon a machine spindle; a flange portion extending circumferentially about the sleeve member; a collet closing member slidably mounted on the sleeve member; a multiplicity of wedge members; and an operating sleeve member slideably mounted on the supporting sleeve member. The flange portion is fixed on the sleeve member against axial movement, in at least the rearward direction, and it has a generally annular bearing surface on the oppositely directed, forward face thereof. The collet closing member also has a generally annular bearing surface, which is disposed in confronting relationship with that of the flange portion bearing surface, at least one of the bearing surfaces being of generally frusto-conical configuration so as to cooperatively define an inwardly tapered circumferential channel between the bearing surfaces. The wedge members are disposed in a circular array about the sleeve member for radial movement within the channel, and they have a cross-sectional configuration that conforms substantially to the channel, with bearing surfaces on the axially spaced forward and rearward faces, and on the radially outward face thereof. The operating sleeve member has a sidewall portion that extends over the outward faces of the wedge members, and defines a compound, circular recess therewithin which is comprised of a relatively large-radius forward section, a relatively small-radius rearward section, and a transition section therebetween. The operating sleeve member is slidable between a rearward, open position, in which the forward section of the recess is disposed over the circumferential channel that is formed between the flange portion and closing member bearing surfaces, and a forward, closed position, in which the rearward section of the recess is so disposed. The relatively large radial dimension of the forward section of the recess permits the wedge members to assume radially outward positions within the channel, when the operating sleeve member in its open position. The relatively small dimension of the rearward section forces the wedge members to radially inward positions, when the operating sleeve member is moved to its closed positions, causing them to increase the separation between the bearing surfaces of the flange portion and the closing member, thereby shifting the latter forwardly and ultimately effecting closure of a collet operatively connected thereto.

In the preferred embodiments of the invention, the frusto-conical bearing surface will be presented on the flange portion and the bearing surface of the closing member will be substantially planar, and normally the closing member will have a forwardly directed thrust surface thereon which is adapted for operative contact with other force-transmitting means. Most desirably, each of the wedge members will have an arcuate inner edge portion which is disposed for contact on the frusto-conical bearing surface, the curvature of which inner edge portion will have a radius that is substantially equal to a radius presented at an intermediate position between the margins of the frusto-conical surface, and preferably midway therebetween. The inner edge portion of such a wedge member will desirably reside substantially at that intermediate position when the operating sleeve member is in its open position, thereby affording maximum surface contact when closing force is first applied. It is especially desirable that each of the wedge members be provided with a bevelled transition surface portion between the rearward and outward faces thereof, with the transition surface portion having a single radius of curvature which substantially matches that of the outward face of the wedge member and the relatively small radius section of the operating sleeve member recess.

BRIEF DESCRIPTION OF THE DRAWINGS

FIG. 1 is an exploded perspective view of a collet-operating mechanism embodying the present invention;

FIG. 2 is a cross-sectional view of the operating sleeve utilized in the mechanism of FIG. 1, taken along line 2—2 thereof and drawn to an enlarged scale;

FIG. 3 is a view similar to FIG. 2, showing the internal support sleeve of the mechanism;

FIG. 4 is a view similar to FIGS. 2 and 3, showing the collet-closing member, or thrust collar;

FIG. 5 is a rear elevational view of the array of wedge members utilized in the mechanism of FIG. 1, and drawn to the scale of FIGS. 2-4;

DETAILED DESCRIPTION OF THE PREFERRED AND ILLUSTRATED EMBODIMENTS

Figure 6:
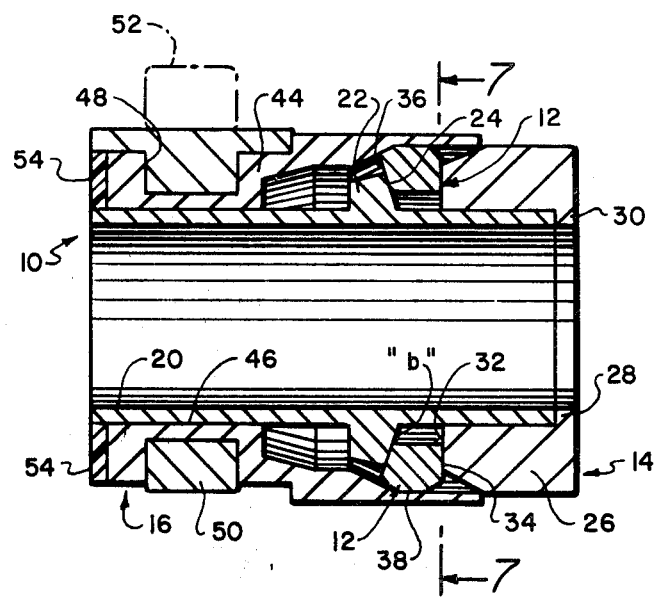
FIG. 6 is a further enlarged sectional view taken along line 2—2 of FIG. 1, illustrating the mechanism in assembly with the operating sleeve in its open position, and showing an actuating shoe attached thereto.

Turning now in detail to FIGS. 1-9 of the drawings, therein illustrated is a collet-operating mechanism embodying the present invention, and comprised of an inner support spindle, a multiplicity of wedge members, a thrust collar, and an outer operating sleeve, being generally designated by the numerals 10, 12, 14, and 16, respectively. The inner sleeve 10 consists of a cylindrical body portion 18, through which passes a bore 20, and on which is integrally formed a circumferential collar portion 22. The forward face 24 of the collar portion 22 is of frusto-conical configuration, providing an inclined bearing surface thereon.

The thrust collar 14 is slideably mounted on the forward end of the supporting sleeve 10, and is comprised of a generally cylindrical body portion 26 and a narrow inwardly projecting circular lip 28, which provides, on its forward face, a thrust surface 30. The rearward face of the collar is substantially planar, to provide a flat annular bearing surface 32 thereon.

The bearing surfaces of each of the wedge members 12 may be characterized as a forward face 34, a rearward face 36, an outward face 38, and a transition surface 40 extending between the rearward and outward faces; the function and significant features of the wedge members 12 will be discussed in considerable detail hereinbelow, particularly with reference to FIGS. 11 and 12. Also of substantial importance to the optimal design of the mechanism is the curvature of the inner, rearward edge 42 of the wedge members 12, as will also be discussed hereinafter.

The operating sleeve 16 consists of a rear portion 44, through which passes an axial bore 46 of circular cross-section and of a diameter substantially equal to the outside diameter of the cylindrical portion 18 of the support sleeve 10, to permit slideable mounting of the operating sleeve 16 thereupon. The outside surface of the rear portion 44 has a circumferential groove 48 formed therein, within which is received the actuating shoe 50 (seen in FIGS. 6 and 8). A roller 52 (shown in phantom line) is attached to the shoe 50, and is so disposed as to engage an operating cam provided on the rotating head of the machine (not shown), for intermittent actuation in timed sequence with the work-indexing mechanisms of the machine. A phenolic shock washer 54 is mounted on the rearmost end of the body 18 of the inner sleeve 10, to absorb the impact of the rearwardly moving sleeve 16.

The forward end of the sleeve is machined to provide an internally stepped cylindrical sidewall portion 56, which defines a well or recess of compound configuration; specifically, its salient features consist of a relatively large section 58 at the forwardmost end, a relatively small rearward section 60, and a frusto-conical transition section 62 therebetween. Mention might be made here of the circular edge 64 of the sidewall portion 56 located at the juncture of the sections 60 and 62, the significance of which will however be discussed hereinbelow.

Figure 7:
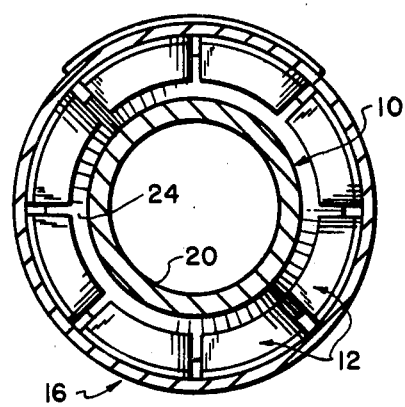
FIG. 7 is a cross-sectional view of the assembly of FIG. 6, taken along line 7—7 thereof.

With specific reference now to FIGS. 6 and 7, the collet operating mechanism is depicted therein in its open condition. The operating sleeve 16 is fully withdrawn by the shoe 50 into a position against the shock washer 54, with the enlarged recess section 58 disposed over the channel that is defined between the confronting surfaces of the circumferential flange 22 and the thrust collar 26. The wedge members 12 are cammed against the inclined bearing surface 24 (under rearward force exerted from the collet through the thrust collar 14) to radially outward positions against the enlarged sidewall portion. Their movement to this position obviously permits a rearward shifting of the thrust collar 14, in turn permitting the collet elements to assume an outwardly sprung (i.e., open) condition. The radial spacing of the wedge members 12 from the body 18 of the support sleeve 10, and the circumferential spacing between adjacent members 12, are illustrated in FIG. 7.

Figure 8:
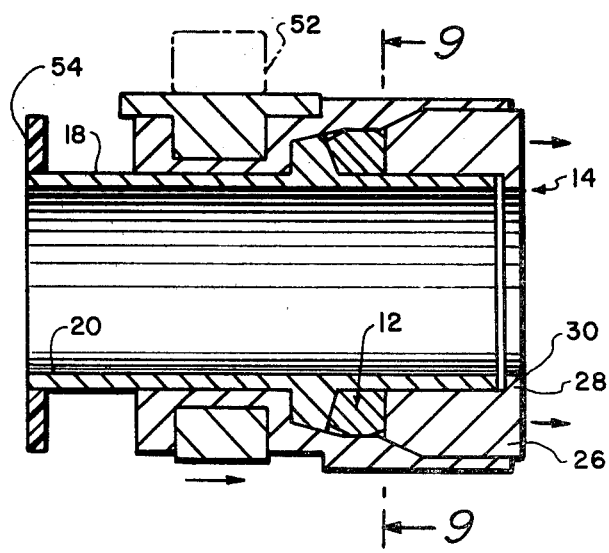
FIG. 8 is a view similar to to that of FIG. 6, showing the operating sleeve in its closed position.
Figure 9:
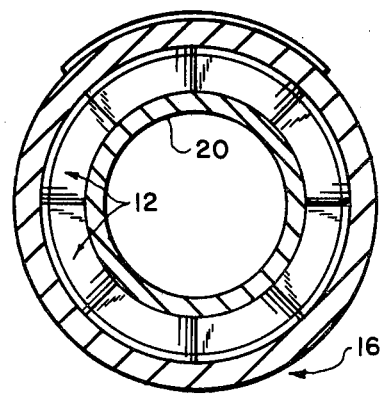
FIG. 9 is a cross-sectional view taken along line 9—9 of FIG. 8.

As can best be seen with reference to FIG. 8, shifting the shoe 50 (and thereby the operating sleeve 16) in a forward direction (i.e., to the right) causes the relatively small diameter section 60 of the recess within the sidewall 56 to be disposed over the channel between the flange 22 and the collar 14. Because of the reduced dimensions of the section 60, the wedge members 12 are forced inwardly by the corresponding wall portions, thus forcing the thrust collar 14 to shift to a slightly more forward position on the body 18; this, in turn, actuates collet-closing elements through contact on the thrust surface 30, as will be described more fully hereinbelow. Once again, the circumferential and radial spacing of the wedge members 12, with respect to one another and with respect to the body 18, are depicted in FIG. 9.

Figure 10:
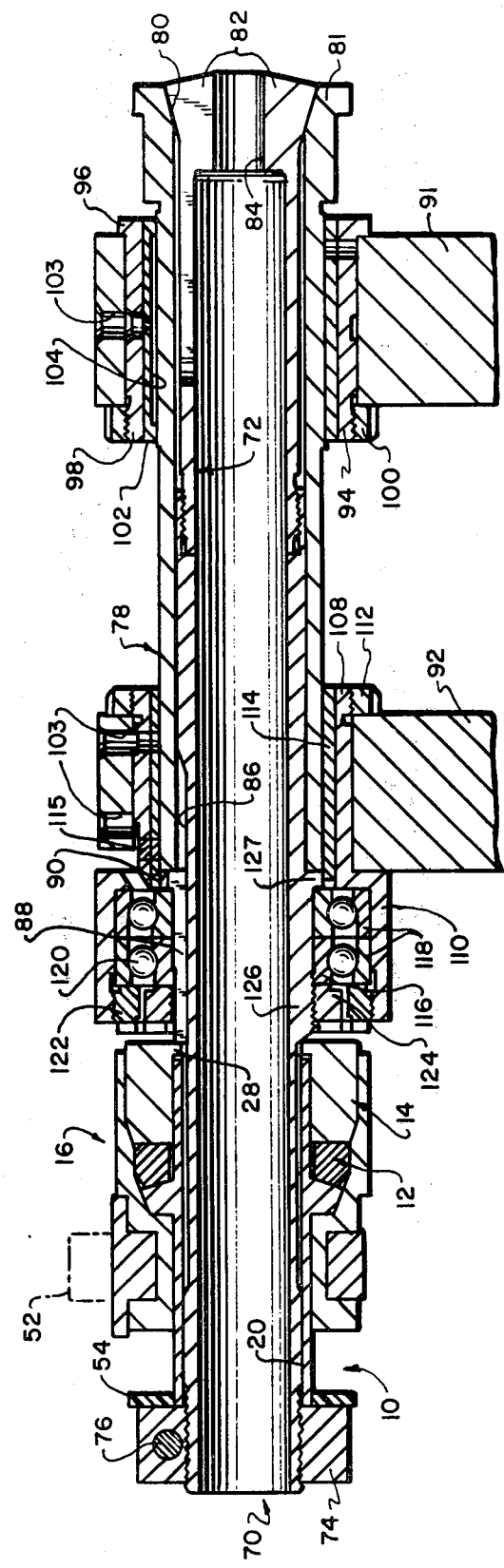
FIG. 10 is a cross-sectional view of the collet-operating mechanism of the invention mounted upon a machine spindle, and showing the collet and associated operative parts.

Turning now to FIG. 10, a spindle assembly, typical of the sort in which a collet and the operating mechanism of the invention are employed, is illustrated in some detail to provide a complete understanding of the operation of the mechanism. The assembly includes an inner spindle, generally designated by the numeral 70, on the forward end of which is threadably engaged a collet, generally designated by the numeral 72, and upon the rearward end of which is mounted the support sleeve 10 of the collet-operating mechanism, with the spindle 70 received through the bore 20 thereof. The collet-operating mechanism, is secured on the inner spindle 70 by an adjustable split nut 74, which is, in turn, fixed in the selected location by tightening of the locking bolt 76, which passes through the portions thereof. Disposed about the forward end of the inner spindle 70 and the collet 72 is an outer spindle, generally designated by the numeral 78, which has an inwardly tapered opening 80 formed within its forward end portion 81, and within which is received the flared forward end portion 82 of the collet 72. Although not specifically illustrated, it will be appreciated that the collet is of conventional construction, with its forward end portion being divided into three identical segments by axially extending slots (only one of which is visible). The segments cooperatively define an axial passageway 84 therethrough, and in operation they are compressed tightly upon the workpiece passing through the passageway 84, to effect its engagement; this is, of course, achieved by shifting the outer spindle 78 over the collet 72, causing the end portion 81 to bear upon, and thereby force inwardly, the flared portions 82 of the collet.

An elongated connecting bar or extension 88 is slidably received within each of three equidistantly spaced slots 86 formed about the inner spindle 70, and each has its rearward end in contact with the thrust surface 30 on the lip 28 of the collar 14, and its forward end in contact with the trailing edge 90 of the outer spindle 78. Hence, forward shifting of the thrust collar 14, under the action of the operating sleeve 16 and the wedges 12, will transmit the force through the elongated extensions 88 to the outer spindle 78, and thereby effect closing of the collet 72, in the manner described.

The spindle assembly is rotatably mounted by appropriate bearing assemblies secured to front and rear frame portions 91, 92, respectively. The forwardmost bearing assembly consists of a cylindrical housing 94, which has a circumferential lip 96 at one end and a threaded portion 98 at the other. The housing 94 is inserted into an appropriate opening in the frame portion 91 to the point of interfenence with the lip 96, and it is secured therein by engaging a nut 100 upon the opposite end. A bronze bushing 102 is press-fit within the passage through the housing 94, and appropriate oil holes and distribution grooves 103, 104, respectively, are provided in the several parts.

A similar bearing assembly is utilized in the rear frame portion 92, but is more elaborate in that a roller bearing sub-assembly is included therein. The housing consists of a cylindrical front portion 108 and an enlarged rear portion 110, the former being received in a frame opening and being secured in place by a threadably engaged nut 112. As in the case of the forward bearing assembly, a bronze bushing 114 is fitted within the passage through the cylindrical portion 108, and suitable oil holes 103 and grooves are provided; the bushing 114 is staked to the housing portion 108 by a locking pin 115. The roller bearing sub-assembly consists of an inner race 116, outer race parts 118, and a multiplicity of roller bearings 120. The outer race parts 118 are held in place by a nut 122, which is threadably engaged within the opening of the enlarged housing portion 110, and the inner race 116 is similarly held by a second nut 124. The nut 124 is engaged upon a threaded portion 126 of the inner spindle 70, which also has a circumferential flange 127 to cooperatively retain the inner race 116 of the bearings. A suitable key (not shown) is provided to interengage the inner and outer spindles 70, 72 to ensure that they rotate together.

Figure 11:
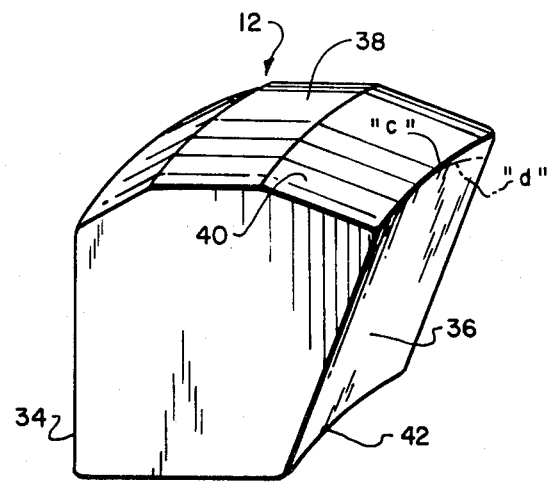
FIG. 11 is a perspective view of a preferred form of wedge member utilized in the present mechanism.
Figure 12:
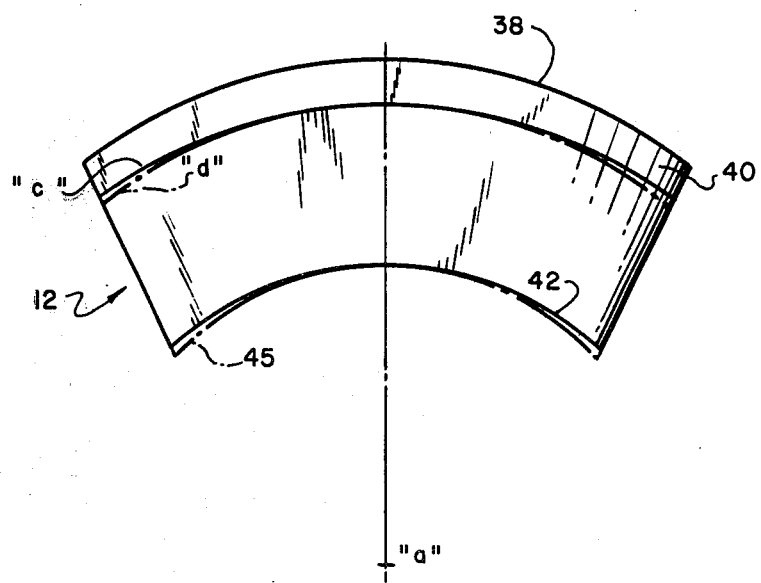
FIG. 12 is an elevational view of the wedge member of FIG. 11, showing the rear face and the transition surface thereof, with a "true" radius portion thereof shown in phantom line.

Turning to FIGS. 11 and 12, th wedge members 12 are illustrated in considerable detail, to best describe unique and preferred features thereof by which optimal performance of the mechanism is afforded. As can best be seen in FIG. 12, each wedge member comprises a toroidal segment, and has a generally arcuate configuration as viewed in front elevation. However, the normal curvatures that would be associated with a regular segmental section of this sort are modified in the present wedge members to provide a maximum contact surface, and thereby to minimize wear upon the most susceptible portions of the mechanism.

More particularly, takine the point designated "a" as the center from which the toroidal segment is generated, the curvature of the outer surface 38 of the wedge member 12 is a true arc; i.e., it lies on a locus of points which are equidistant from point "a". The same is not, however, true of the edge 42 along the inner margin of the rearward face 36, which curvature has an enlarged radius; the true arc that would be generated from point "a" is shown as phantom line 45. The reason for producing edge 42 with a reduced curvature (enlarged radius) is to cause that edge to correspond to the radius of curvature of the frusto-conical bearing surface 24 at a point (e.g. "b" in FIG. 6) that is intermediate the margins thereof. In this manner, the entire edge 42 of the wedge member 12 is caused to lie in full surface contact with the bearing surface 24 of the sleeve flange 22 at the point of initial movement from the open position of the collet-operating mechanism, at which point the wedge members will generally be about half-way out of the channel. Since this is the position at which substantial force will begin to develop upon closure of the collet, so maximizing the area of contact will minimize wear upon the relatively sliding parts.

A second wear-reducing feature of the wedge members is illustrated in FIGS. 11 and 12, and constitutes the curvature of the transition surface 40. Specifically, in accordance with the present invention that surface is beneficially formed with a constant radius, equal to that defining the curvature of the outward surface 38, notwithstanding that the transition surface 40 has an inward bevel. Thus, the transition edge "c" has the same radius as the surface 38, and again is of a lesser curvature than it would normally be, were the point "a" utilized as the center for its generation; this can best be seen by comparing the curvature of line "c" with that of phantom line "d", which represents a true radial locus from point "a".

The importance of so configuring the transition surface 40 is that it greatly reduces wear at the juncture line 64 between the transition section 62 and the relatively small radius section 60 of the recess within the operating sleeve 16 (see FIG. 2). The edge at 64 is subjected to the most severe loading, because it represents the location of minimal contact surface when forces of the greatest magnitude are being transmitted to the collet. Accordingly, it is most desirable that the edge 64 be capable surface contact with the full lateral and transverse expanse of the transition surfaces 40 while the sleeve 16 is riding thereover, and this is accomplished by forming the transition surfaces 40 with a single radius, which is the same as that to which the outward surfaces 38 are formed and which substantially matches the radius of the edge 64.

Figure 13:
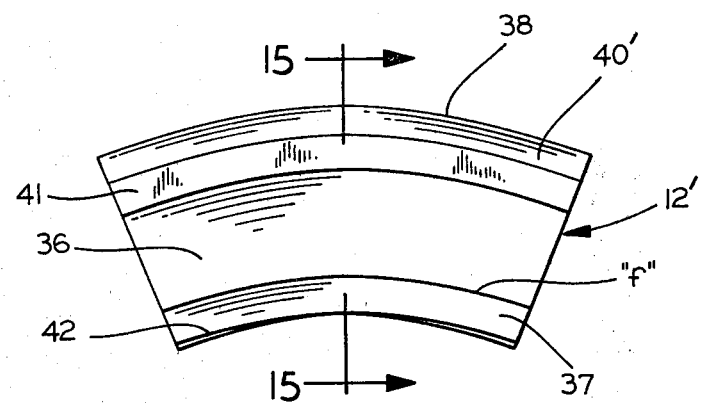
FIGS. 13 and 14 are front and rear elevational views of a second embodiment of wedge members suitable for use in the present mechanism.
Figure 14:
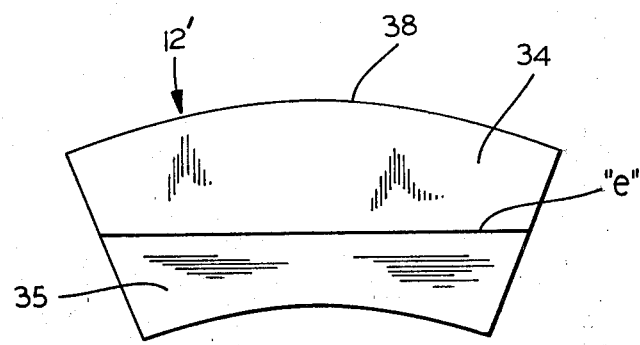
Figure 15:
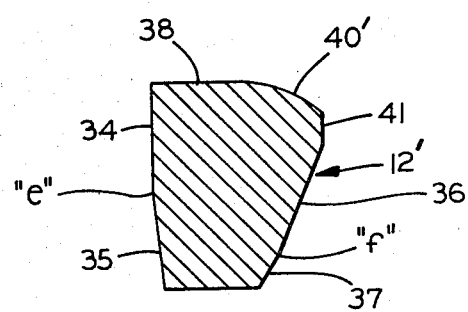
FIG. 15 is a sectional view thereof, taken along line 15—15 in FIG. 13.

Turning finally to FIGS. 13-15, a most desirable embodiment of wedge members is illustrated, and is generally designated by the numeral 12'; to the extent that comparable features are present therein, the same members will be employed as were utilized in connection with FIG. 11 and 12. The significant modifications incorporated into the wedge member 12' consist of the slight reliefs or bevelled inner zone surfaces 35,37 formed on the forward and rearward faces 34,36 thereof, respectively; typically, the bevel angle will be about 5 degrees relative to the associated face, or outer zone surface 34,36, as the case may be. The formation of the surfaces 35,37 produces compound faces and results in the presence of a rectilinear ridge line "e" at the juncture of the surface 35 with the face 34, and of an arcuate ridge line "f" at the juncture of the surface 37 with the face 36. As best seen in FIG. 15, the ridge line "e" is offset on the wedge member 12' above the line "f", which promotes a rocking action of the member 12' when the closing force of the operating sleeve 16 is released, with the ridge lines "e" and "f" providing pivot points for such movement. In this manner, any tendency for the wedge members to bind between the collar portion 22 of the inner sleeve 10 and the body portion 26 of the thrust collar 14, that might otherwise occur, is greatly reduced or completely eliminated. Although the separation between lines "e" and "f" may appear quite large, that is due to the scale to which FIGS. 13-15 are drawn, which is about four times a typical actual size of the wedge member. In fact, the ridge line offset need only be on the order of about 1/16 inch to produce the desired action. While all of the collet-operating mechanisms of the invention function smoothly and with a high degree of dependability, as well as affording the additional benefits herein pointed out, those that utilize the compound-faced wedge members of FIGS. 13-15 function with utmost reliability, and hence their use represents a most preferred practice of the invention.

It should be appreciated that, although the inner zones of the compound faces have been represented as substantially flat surfaces, the bevels can also be "radiused" or curved, if so desired, in which event the ridge lines will be smoother and less well-defined, and hence less prone to wear. The significant factors are, of course, that relieved areas be provided adjacent the outer zones, and that offset lines of pivoting be defined therebetween on the forward and rearward faces of the member. As can be seen in FIG. 15, the surface 40' can also be of curvilinear cross-section, and the wedge member can be further modified, such as by the provision of the edge flat 41 at the juncture between surfaces 40' and 36; it may moreover have all of the features described in connection with FIGS. 11 and 12.

As will be appreciated by those skilled in the art, the utilization of an array of wedges enables a maximum amount of surface area to be presented for contact upon the bearing surfaces of the flange 22 and collar 26. This is particularly true when the modifications discussed in connection with FIGS. 11 through 15 are incorporated but, in any event, it is in dramatic contrast to the conditions that exist when ball bearings are used. While the respective areas might be calculated, suffice to say that the total contact area provided by the wedges that are utilized in accordance with the present invention is much greater than that which spherical members would provide; indeed, there are orders of magnitude of difference. As yet a further benefit, it might be noted that the array of wedge members requires no cage or other structure to maintain their relative positions, such as is necessary with ball bearings.

It will also be appreciated that the number of wedge members utilized in the array may vary, although 6 to 8 appears to be optimal from the standpoint of providing adequate movement of the thrust member without unduly reducing the area of surface contact; the ultimate criterion for producing the wedge members is that they provide the maximum amount of movement with the minimum amount of water. While the amount of movement necessary to operate the collet is quite small (typically about ⅛ inch), still the ends of the wedge members will interfere if they are excessively long (i.e., too few in number). If, on the other hand, there are too many of the wedge members, the spaces therebetween will, again, reduce the effective contact area, and thereby affect durability. It should be noted that, while the various parts of the mechanism can be machined, that is not true of the wedge members when they are produced with the modified curvatures described; in those instances, they would generally be forged or produced by a powdered metallurgy technique, although some machining operations may also be involved.

Modification of a more general nature can, of course, also be made, as will be evident to those skilled in the art. For example, whereas the circumferential flange on the inner sleeve is shown to be integrally formed therewith, it may be desirable to provide the bearing surface on a separate ring, to be fitted upon and supported by the sleeve. This would permit facile replacement and renewal of the bearing surface, as necessary or desired, and such a ring and back-up flange would comprise the "flange portion" of the mechanism.

Thus, it can be seen that the present invention provides a novel collet-operating machanism which avoids the disadvantages of the devices heretofore utilized for the purpose. In particular, it provides such a mechanism in which levers are not employed, thus avoiding the risks attendant to the relatively weak construction that such a design entails, and in which the rate of wear is reduced substantially from that which is inherent in the use of spherical members for the transmission of closing force. The mechanism is of relatively simple design, is relatively inexpensive to produce, and yet operates smoothly to provide a positive and dependable closing action.

Having thus described the invention, what is claimed is:

1. In a collet-operating mechanism, the combination comprising: a supporting sleeve member adapted for mounting upon a machine spindle; a flange portion extending circumferentially about said sleeve member and fixed thereon against axial movement in at least the rearward direction, said flange portion having an annular bearing surface on the oppositely directed forward face thereof; a collet-closing member slidably mounted for limited axial movement on said sleeve member and having a generally annular bearing surface disposed in confronting relationship with said flange portion bearing surface, at least one of said bearing surfaces being of generally frusto-conical configuration so as to cooperatively define an inwardly tapered circumferential channel therebetween; a multiplicity of wedge members disposed in a circular array for radial movement within said channel and extending about said sleeve member, said wedge members having a cross-sectional configuration conforming generally to that of said channel and having bearing surfaces on the axially spaced, forward and rearward faces, and the radially outward face thereof, each of said bearing surfaces on said forward and rearward faces being of compound configuration with an outer and inner zone, the inner zones of said compound faces being bevelled with respect to the corresponding outer zones to define ridge lines therebetween upon which said wedge member can pivot against said flange portion and closing member bearing surfaces, the ridge line on said forward face being offset outwardly from that on said rearward face to permit rocking movement of said wedge member; and an operating sleeve member slidably mounted for axial movement on said supporting sleeve member, and having a sidewall portion extending over said outward faces of said wedge members and defining a compound circular recess therewithin comprised of a relatively large radius forward section, a relatively small radius rearward section, and a transition section therebetween, said operating sleeve member being movable between a rearward, open position in which said forward section of said recess is disposed over said circumferential channel, and a forward, closed position in which said rearward section is so disposed, the relatively large dimensions of said forward section of said recess permitting said wedge members to assume radially outward positions within said channel with said operating sleeve member in said open position, and the relatively small dimensions of said rearward section forcing said wedge members to radially inward positions with said operating sleeve member in said closed position thereof, said wedge members acting upon said bearing surfaces of said flange portion and said closing member to shift said closing member forwardly in said closed position of said operating sleeve member, whereby said closing member can effect closure of a collet operatively connected thereto, movement of said sleeve member from said closed position to said open position thereof promoting pivoting of said wedge members, thereby obviating any tendency for binding thereof in said channel, that might otherwise exist.

2. The mechanism of claim 1 wherein said frusto-conical bearing surface is on said flange portion, and said bearing surface of said closing member is substantially planar.

3. The mechanism of claim 2 wherein said closing member has a forwardly directed thrust surface which is adapted for operative contact with collet-operating members.

4. The mechanism of claim 1 wherein said wedge members are disposed freely and closely adjacent to one another within said channel between said bearing surfaces.

5. In a collet-operating mechanism, the combination comprising: a supporting sleeve member adapted for mounting upon a machine spindle; a flange portion extending circumferentially about said sleeve member and fixed thereon against axial movement in at least the rearward direction, said flange portion having an annular bearing surface on the oppositely directed forward face thereof; a collet-closing member slidably mounted for limited axial movement on said sleeve member and having a generally annular bearing surface disposed in confronting relationship with said flange portion bearing surface, at least one of said bearing surfaces being of generally frusto-conical configuration so as to cooperatively define an inwardly tapered circumferential channel therebetween; a multiplicity of wedge members disposed in a circular array for radial movement within said channel and extending about said sleeve member, said wedge members having a cross-sectional configuration conforming substantially to that of said channel and having bearing surfaces on the axially spaced forward and rearward faces, and the radially outward face thereof; and an operating sleeve member slidably mounted for axial movement on said supporting sleeve member, and having a sidewall portion extending over said outward faces of said wedge members and defining a compound circular recess therewithin comprised of a relatively large radius forward section, a relatively small radius rearward section, and a transition section therebetween, said operating sleeve member being movable between a rearward, open position in which said forward section of said recess is disposed over said circumferential channel, and a forward, closed position in which said rearward section is disposed, over said circumferential channel the relatively large dimensions of said forward section of said recess permitting said wedge members to assume radially outward positions within said channel with said operating sleeve member in said open position, and the relatively small dimensions of said rearward section forcing said wedge members to radially inward positions with said operating sleeve member in said closed position thereof, each of said wedge members having an arcuate inner edge portion disposed for contact on said frusto-conical bearing surface, the curvature of said inner edge portion having a radius which is substantially equal to a radius presented at a position intermediate the margins of said frusto-conical surface, said wedge members acting upon said bearing surfaces of said flange portion and said closing member to shift said closing member forwardly in said closed position of said operating sleeve member, whereby said closing member can effect closure of a collet operatively connected thereto.

6. The mechanism of claim 5 wherein said frusto-conical bearing surface is on said flange portion, and said bearing surface of said closing member is substantially planar.

7. The mechanism of claim 6 wherein said closing member has a forwardly directed thrust surface which is adapted for operative contact with collet-operating members.

8. The mechanism of claim 5 wherein said inner edge portion of said wedge member resides substantially at said intermediate position when said operating sleeve member is in said open position thereof.

9. The mechanism of claim 5 wherein said intermediate position is approximately midway between said margins.

10. The mechanism of claim 5 wherein said wedge members are disposed freely and closely adjacent to one another within said channel between said bearing surfaces.

11. In a collet-operating mechanism, the combination comprising: a supporting sleeve member adapted for mounting upon a machine spindle; a flange portion extending circumferentially about said sleeve member and fixed thereon against axial movement in at least the rearward direction, said flange portion having an annular bearing surface on the oppositely directed forward face thereof; a collet-closing member slidably mounted for limited axial movement on said sleeve member and having a generally annular bearing surface disposed in confronting relationship with said flange portion bearing surface, at least one of said bearing surfaces being of generally frusto-conical configuration so as to cooperatively define an inwardly tapered circumferential channel therebetween; a multiplicity of wedge members disposed in a circular array for radial movement within said channel and extending about said sleeve member, said wedge members having a cross-sectional configuration conforming substantially to that of said channel and having bearing surfaces on the axially spaced forward and rearward faces, and the radially outward face thereof; and an operating sleeve member slidably mounted for axial movement on said supporting sleeve member, and having a sidewall portion extending over said outward faces of said wedge members and defining a compound circular recess therewithin comprised of a relatively large radius forward section, a relatively small radius rearward section, and a transition section therebetween, said operating sleeve member being movable between a rearward, open position in which said forward section of said recess is disposed over said circumferential channel, and a forward, closed position in which said rearward section is disposed over said circumferential channel, the relatively large dimensions of said forward section of said recess permitting said wedge members to assume radially outward positions within said channel with said operating sleeve member in said open position, and the relatively small dimensions of said rearward section forcing said wedge members to radially inward positions with said operating sleeve member in said closed position thereof, each of said wedge members having a bevelled arcuate transition surface portion thereon extending between said rearward and outward faces thereof and cooperating with said transition section of said operating sleeve member, said transition portion having a single radius of curvature, said wedge members acting upon said bearing surfaces of said flange portion and said closing member to shift said closing member forwardly in said closed position of said operating sleeve member, whereby said closing member can effect closure of a collet operatively connected thereto.

12. The mechanism of claim 11 wherein said frusto-conical bearing surface is on said flange portion, and said bearing surface of said closing member is substantially planar.

13. The mechanism of claim 12 wherein said closing member has a forwardly directed thrust surface which is adapted for operative contact with collet-operating members.

14. The mechanism of claim 11 wherein said single radius of curvature is substantially equal to that of said relatively small radius section of said operating sleeve member recess.

15. The mechanism of claim 11 wherein said wedge members are disposed freely and closely adjacent to one another within said channel between said bearing surfaces.

* * * * *